A. ELMENDORF.
PLYWOOD DISK WHEEL.
APPLICATION FILED APR. 7, 1920.
1,413,906.
Patented Apr. 25, 1922.
2 SHEETS—SHEET 1.
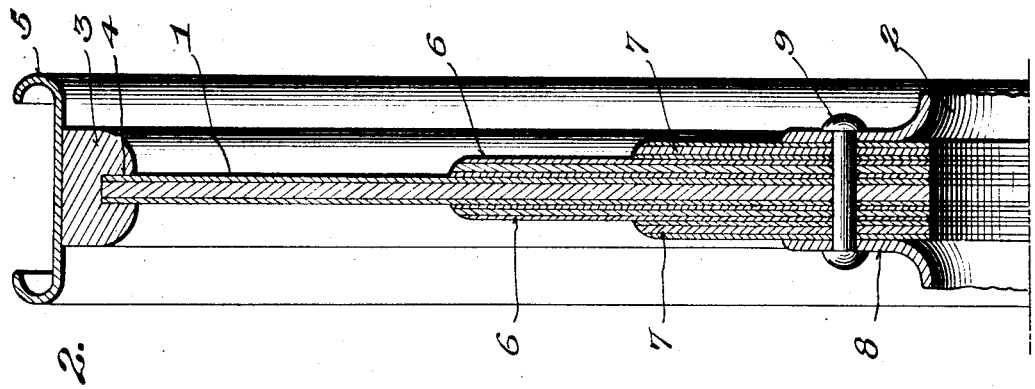
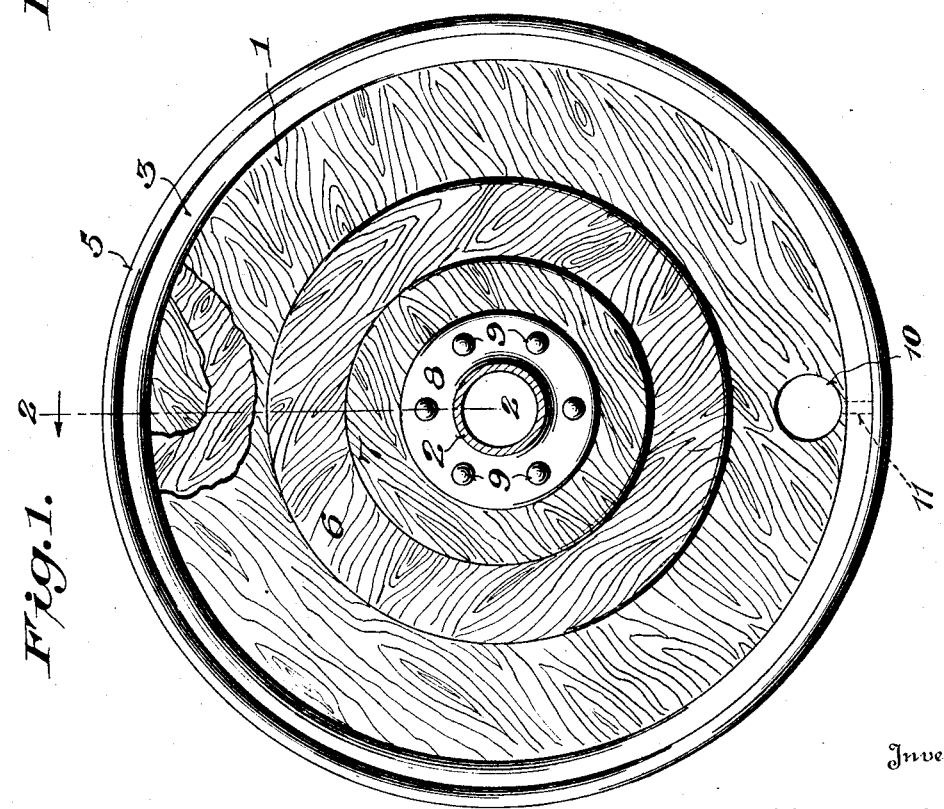
Inventor
Armin Elmendorf,
WITNESS:—
Chas. L. Griesbauer
By Wm. L. Symons
Attorney

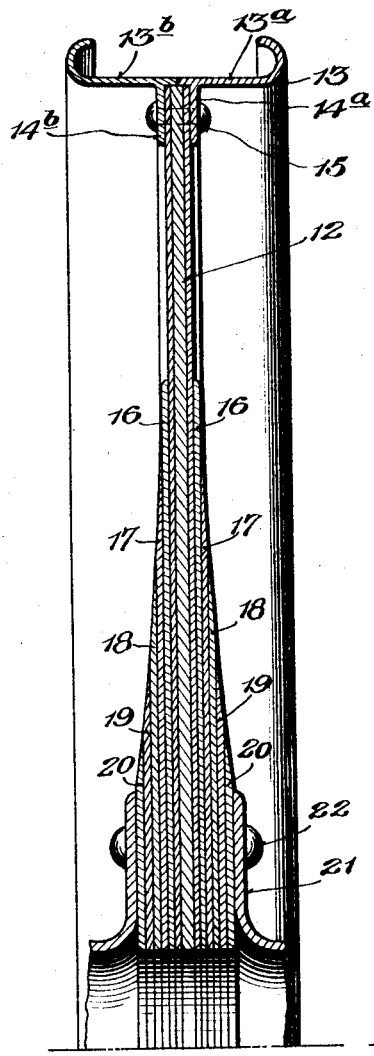
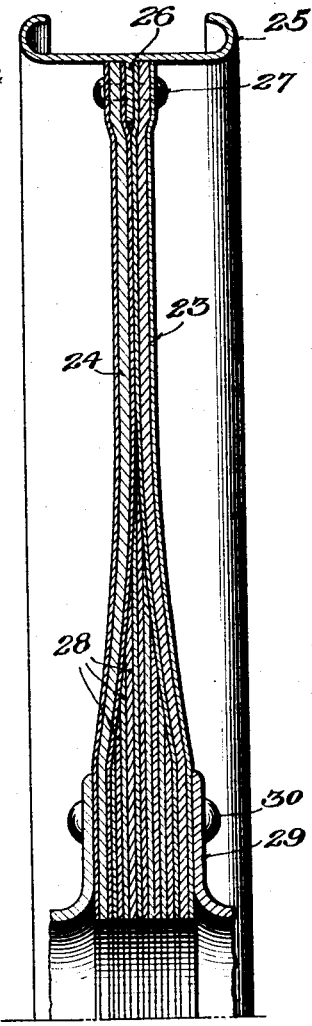
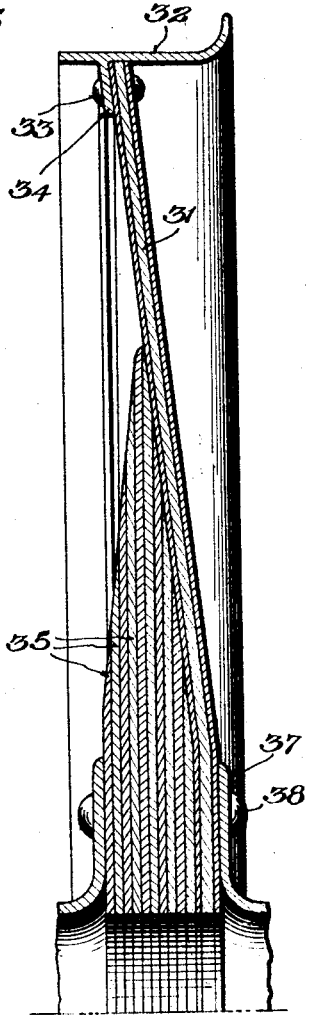

UNITED STATES PATENT OFFICE.

ARMIN ELMENDORF, OF MADISON, WISCONSIN.

PLYWOOD DISK WHEEL.

1,413,906.     Specification of Letters Patent.     Patented Apr. 25, 1922.

Application filed April 7, 1920. Serial No. 372,014.

*To all whom it may concern:*

Be it known that I, ARMIN ELMENDORF, a citizen of the United States of America, residing at Madison, in the county of Dane and State of Wisconsin, have invented certain new and useful Improvements in Plywood Disk Wheels, of which the following is a specification.

My invention relates to the construction of wheels for vehicles and for other purposes from disks of plywood, the term "plywood" being used as indicating a laminated material made of two or more plies of wood.

Some of the objects of my improved construction of wheels from disks of plywood are to produce light, strong, durable, cheap and symmetrical wheels. Wheels constructed in accordance with my invention have the material so distributed that the maximum of strength is obtained per unit of weight. My invention results in the production of wheels which are light in comparison with their strength and in which the possibility of warping, which has been one of the defects of plywood wheels, is minimized. The amount of material required for wheels made according to my invention is reduced to a minimum, thereby making the cost low.

Another object of my invention is to overcome the well-known tendency of wheels used on vehicles to fracture at the hub. This may occur, for instance, when the wheel strikes an obstruction in skidding or when the wheels follow an irregular rut. One means of accomplishing this object is by increasing the thickness of the material from the rim of the wheel toward the hub. It is apparent, also, that as the distance from the hub outward increases, the width of the material used to construct a wheel according to my invention increases, which results in increase of strength from the hub to the rim for equal thickness of material.

Another object of my invention is to produce a wheel of balanced design. By the term "balanced design" I mean a wheel so constructed that failure is as liable in one part of the wheel as in another.

A further object of my invention is the construction of a wheel of disks of plywood in which the grain of the plies constituting the disks runs in different directions, which results in great strength for the weight of the material.

A still further object of my invention is to make a wheel which will be easy to clean, which will not collect or hold mud like the ordinary spoke wheel, and which may be given an attractive appearance by being varnished or finished in any of the well-known ways of treating wood.

With these and further objects in view, I shall describe my invention by referring to the drawings showing one embodiment of my invention in which, Figure 1 is a side elevation of my wheel with a part broken away;

Figure 2 is a slightly enlarged transverse vertical section on the line 2—2 of Figure 1, with the ends of the hubs partly broken away;

Figure 3 is a corresponding sectional view of a modified form of wheel;

Figure 4 is a sectional view of another modified form of wheel; and

Figure 5 is a sectional view of another modification.

The plywood used in the construction of the wheel illustrated in Figures 1 and 2 consists of three plies, of which the core ply may be about two-thirds of the thickness of the plywood and the face plies may each be about one-sixth of the thickness of the plywood. A disk of plywood 1, constructed as above indicated, extends the entire distance from the hub 2 to the wooden felloe 3. This disk is attached to the felloe in any of the usual ways, as by being glued in a recess 4 therein. Attached to the felloe 3 in the usual way is a metal rim 5 of the usual construction to contain a tire, not shown. Disks 6 constructed the same as disk 1 are placed on either side of the disk 1 and extend about two-thirds the distance from the axis of the hub to the metal rim. Disks 7 constructed the same as disk 1 are placed on either side of disks 6 and extend about three-fifths of the distance from the axis of the hub to the metal rim. Plates 8 which, as here disclosed, are of lesser diameter than the disks of plywood 7 are placed on the outside of the disks of plywood 7 and are attached to the plywood disks by bolts 9 extending through all the disks, or in any other of the usual ways. An opening 10 in the disk 1 is made to allow access to the top of the air valve which passes through the opening 11 in the rim and felloe.

The grain of all the face plies is at right angles to the grain of the core plies. The grain of the face ply of each disk is at right angles to the grain of the adjacent face ply.

It is preferable to have disk 1 about one-third or one-fourth of the thickness between the face plates 8; that is, it is thicker than disks 6 and 7.

In making the disks for the wheel described, the plies are first cut in circular form and then glued together in a press or by any other well known means. The disks are glued together in the same way. I do not, however, limit myself to joining the plies or disks by glue as they may be joined by any of the other well-known means of joining disks.

I do not limit the number of disks to five, as illustrated, for a greater or lesser number may be used without departing from the spirit of my invention.

While the disks shown and described are made of three plies, they may be made of a greater or lesser number.

In the form of wheel shown in Figure 3, a disk 12 of the same construction as disk 1, shown in Figure 2, extends the entire distance from the hub to a metal rim 13 which consists of two parts 13ª and 13ᵇ from each of which extend flanges 14ª and 14ᵇ, to which disk 12 is attached in any suitable way, as by bolts or rivets 15. On each side of the disk 12 are disks 16, 17, 18, 19 and 20, consisting of plies of veneer glued or suitably attached to each other and to the three-ply disk 12. The grain of ply 16 is at right angles to the grain of the face ply of disk 12, and the grain of each of the plies 17, 18, 19 and 20 is at right angles to the grain of the ply on which each ply is placed. Plates 21 are fastened to the plies, as by bolts 22. The disks 16 extend a little more than two-thirds of the distance from the axis of the hub to the rim. The other pairs of disks decrease in diameter fairly regularly. This arrangement of disks increases the thickness of material from the circumference of the disks 16 to the hub and strengthens the wheel at the points of greatest liability to failure. Either more or less than ten disks of veneer may be used in addition to the central disk of plywood.

In the form shown in Figure 4, two three-ply disks 23 and 24, constructed as disk 1 shown in Figure 2, extends from the hub to a rim 25 which has a flange 26 thereon to which the disks 23 and 24 are attached, as by bolts or rivets 27. A plurality of disks 28, five pairs being shown, are placed between the disks 23 and 24, and all the disks are suitably joined, as by gluing. The inner pair extends approximately two-thirds of the distance from the axis of the hub to the rim and tapers to the point of disappearance. Each of the four other pairs of disks is of lesser diameter than the disks on which it is placed. The grain of all disks is made to run at a right angle to the grain of the ply with which it comes in contact. Metal plates 29 are attached to the plies, as by bolts 30. The disks 23 and 24 are molded to the form shown after being suitably softened. The manner of molding is well known in this art.

In the form shown in Figure 5, a disk 31, constructed as disk 1 shown in Figure 2, is made somewhat conical in any of the well-known ways of changing the shape of ply-wood. This disk is attached to a rim 32 by means of bolts 33 passing through a flange 34. A plurality of disks 35, five pairs being shown, are joined together and to disk 31. The outer pair of disks extends approximately one-third of the distance from the axis of the hub to the rim. The next four pairs of disks placed between the first pair each increases in diameter, the center pair extending about two-thirds of the distance from the axis of the hub to the rim. A plate 37 is attached to all the disks as by bolts or rivets 38.

What I claim is:—

1. A wheel comprising a plurality of wooden disks, one of said disks consisting of a core ply and two face plies joined together, said core ply being of a thickness equal to both face plies, and other disks of lesser diameter than said first-mentioned disk.

2. A wheel comprising a plurality of wooden disks, one of said disks consisting of three plies joined together, other of said disks each of lesser diameter than the disk on which it is placed, and means to join all of said disks.

3. A wheel comprising a central disk of plywood made up of three plies and a plurality of single-ply disks placed on both sides of said three-ply disk, and all of said disks attached together.

4. A wheel comprising a central disk of ply-wood made up of three plies, the core ply being equal to or greater in thickness than the combined thickness of both face plies, and a plurality of pairs of single ply disks placed in series on said three-ply disk, the plies constituting the pair being on opposite sides of said three-ply disk and each pair of single ply disks after the first being of lesser diameter than the pair of disks on which it is placed.

5. A wheel comprising a hub, a rim, and a plurality of wooden disks joined together, one of said disks consisting of three plies, the grain of the wood of the face plies placed at an angle to the grain of the wood of the core ply, and a pair of single-ply disks placed on the face plies of the three-ply disk, said pair of single-ply disks having the grain of the wood at an angle to the grain of the wood in the face plies of the three-ply disk, said pair of single-ply disks being about two-thirds the diameter of the said three-ply disk, and a second pair of single-ply disks placed on the first pair of single-ply disks with the grain of the wood of the second pair of single-ply disks at an angle to the grain of the wood of the first pair of single-ply disks, and said second pair of single-ply disks of lesser diameter than the first pair of single-ply disks.

6. A wheel comprising a hub, a rim, and a plurality of wooden disks joined together, one of said disks consisting of three plies, the core ply equal to or greater in thickness than the two face plies, the grain of the wood of the face plies placed at an angle to the grain of the wood of the core ply, and a pair of single-ply disks placed on the face plies of the three-ply disk, said pair of single-ply disks having the grain of the wood at an angle to the grain of the wood in the face plies of the three-ply disk, said pair of single-ply disks being about two-thirds the diameter of the said three-ply disk, and a second pair of single-ply disks placed on the first pair of single-ply disks with the grain of the wood of the second pair of single-ply disks at an angle to the grain of the wood of the first pair of single-ply disks, and said second pair of single-ply disks of lesser diameter than the firt pair of singly-ply disks.

7. A wheel comprising a plurality of wooden disks, one of said disks consisting of a core-ply and two face-plies, joined together, said face-plies being thinner than said core-ply, and other disks of lesser diameter than said first-mentioned disk.

8. A wheel comprising a plurality of wooden disks, one of said disks consisting of a core-ply and two face-plies, joined together, said core-ply being thicker than said face-plies and other disks of lesser diameter than said first-mentioned disk.

9. A wheel comprising a plurality of wooden disks, the central one of said disks consisting of a plurality of plies, all of said plies being of the same diameter and joined together, and the remaining disks being symmetrically distributed with regard to the central disk in such a way that for each disk on one side of the central disk there is another disk of the same size and thickness on the opposite side of the central disk and at the same distance from the circumference of the central disk, the diameters of the disks being progressively smaller as the distance from the central disk increases.

In testimony whereof I affix my signature.
ARMIN ELMENDORF.